United States Patent [19]

Mitchell

[11] Patent Number: 5,408,404
[45] Date of Patent: Apr. 18, 1995

[54] HIGH FREQUENCY INTERLEAVED DC-TO-AC POWER CONVERTER APPARATUS

[75] Inventor: Daniel M. Mitchell, Cedar Rapids, Iowa

[73] Assignee: Rockwell International Corp., Seal Beach, Calif.

[21] Appl. No.: 36,792

[22] Filed: Mar. 25, 1993

[51] Int. Cl.⁶ .............................................. H02M 7/53
[52] U.S. Cl. ...................................... 363/71; 363/41; 363/131; 323/282
[58] Field of Search .................. 363/41, 71, 98, 97, 363/131–134; 307/58; 323/282, 351

[56] References Cited

U.S. PATENT DOCUMENTS

| | | | |
|---|---|---|---|
| 3,697,717 | 10/1972 | Kornrumpf et al. | 363/71 |
| 3,852,655 | 12/1974 | Justice | 363/71 |
| 4,244,016 | 1/1981 | Mitchell | 363/98 |
| 4,338,658 | 7/1982 | Toy | 363/72 |
| 4,339,791 | 7/1982 | Mitchell | 363/41 |
| 4,341,928 | 7/1982 | Stanson et al. | 363/74 X |
| 4,479,175 | 10/1984 | Gille et al. | 363/41 |
| 4,691,269 | 9/1987 | Yamane et al. | 363/41 |

*Primary Examiner*—Steven L. Stephan
*Assistant Examiner*—Adolf Berhane
*Attorney, Agent, or Firm*—Kyle Eppele; M. Lee Murrah; H. Fredrick Hamann

[57] ABSTRACT

An apparatus and method for accomplishing DC-to-AC power conversion that combine the AC outputs of n interleaved, time division multiplexed inverters and steer the secondary pulses positively or negatively, as commanded by the time varying reference signal, such that the effective switching, or sampled-data, frequency of any of the inverter or pulse-steering transistors. The n interleaved inverter system can, in turn, be paralleled such that, relative to a single inverter supplying all the power, the losses for any inverter transistor are 1/np, n due to time multiplexing and p due to paralleling.

6 Claims, 4 Drawing Sheets

HIGH FREQUENCY INTERLEAVED DC-TO-AC POWER CONVERTER APPARATUS

BACKGROUND

This invention relates to power converters and more specifically to interleaved direct-current to alternating-current power converters.

Power conversion problems are encountered when utilizing equipment designed for alternating current (AC) power in an environment where only direct current (DC) power is available or where a DC primary power link is purposely employed to provide a battery back up in the event AC power becomes unavailable. In these applications a DC-to-AC power converter is needed to interface the equipment to the primary power system. Virtually all modern AC equipment operates from either 115 or 230 volts, plus or minus 10 percent, at either 50, 60 or 400 Hz, plus or minus 5 percent. In general, DC primary power supplies are normally within the 11 to 32 volts DC range. This includes, for example, most modern aircraft and vehicular equipment.

In the prior art, the simplest approach to DC-to-AC power conversion was the use of a 60/400 Hz inverter followed by a low frequency transformer and filter. Regulation is achieved by preceding the inverter with an ultrasonic switching regulator or alternatively achieved in the inverter itself by varying the duty cycle of the inverter. In the case of the latter approach, the output filter must accommodate the worst case harmonic content of the signal's waveform which usually occurs at maximum input voltage. In the case of the former approach, the burden on the output filter is reduced because the DC level to the inverter is held constant. However, the switching regulator adds to the cost and degrades the efficiency of the overall power converter. In either case, the output filter must provide significant attenuation at the fundamental output frequency in order to provide a sinusoidal waveform.

The next level of sophistication of power converter design, in the prior art, is not only to vary the duty cycle of the inverter, but to chop the inverter's output signal into pulses with variable pulse widths by means of ultrasonic switching by using either feedback control against a sinusoidal reference or by "open loop programming" of the control to distribute the width of the pulses in a sinusoidal fashion, as described in U.S. Pat. No. 4,244,016 incorporated herein by reference. The burden of the output filter is thus, reduced. Sinusoidally distributing the ultrasonic switching allows the reduction in the size of the output filter and improves closed loop response. These improvements are a result of the higher break point in the frequency response of the output filter and the higher sample data rate of the inverter. However, this approach still requires a large low frequency power transformer. Especially in the application of 50 to 60 Hz AC power, the size of the transformer completely dominates the size and weight of the power converter.

A further level of sophistication of power converter design, in the prior art, was for the inverter to generate bi-directional pulses at the ultrasonic switching frequency, thereby permitting a much smaller power transformer, and to steer these pulses, by means of a secondary switching apparatus, either positively or negatively on a cycle-by-cycle basis, to synthesize the same sinusoidally distributed pulse-width-modulated signal for application to the high break point output filter as described in U.S. Pat. No. 4,339,791 incorporated herein by reference.

However, for any given ultrasonic switching frequency, there is a maximum output frequency for which faithful reproduction of the waveshape, sinusoidal or otherwise, can reasonably be achieved. Particularly in high power, high efficiency switching power amplifier applications, where modulation frequencies can be much higher than standard power line frequencies, approaching the ultrasonic range themselves, there exists a need for high power, even wider bandwidth power converters to track high frequency modulation envelopes independent of polarity.

SUMMARY OF THE INVENTION

The present invention is an apparatus and a method that combine the AC outputs of "n" interleaved, time division multiplexed inverters and steer the secondary pulses positively or negatively, as commanded by a time varying reference signal, such that the effective switching, or sampled-data, frequency is 2 n times the operating frequency of any of the inverter or pulse-steering transistors. The "n" interleaved inverter system can, in turn, be paralleled such that, relative to a single inverter supplying all the power, the losses for any inverter transistor are 1/np, n due to time multiplexing and p due to paralleling. Since the pulse steering transistors inherently operate at the inverter frequency, not the effective switching frequency, their losses are reduced simply by 1/p.

To increase the effective switching, or sampled data frequency, an interleaved DC-to-AC converter scheme is herein disclosed. The scheme consists of n inverters, n combining transformers, an active output steering network, and an output filter. For an effective switching frequency of $f_s$, the inverter frequency is $f_s/2n$. This scheme allows the switching losses and conduction losses to be distributed among all inverters. It also permits full dynamic control since one inverter can be in the process of turning on while the other is in the process of turning off thereby eliminating the need to account for commutation time. Another way of looking at it is that since each inverter conducts for only 1/nth of the time, there can be no conduction overlap of top and bottom rail transistors.

It is an object of the present invention to provide an apparatus for accomplishing DC-to-AC power conversion.

It is a feature of the present invention to provide interleaved DC-to-AC power conversion.

It is an advantage of the present invention to provide an apparatus that is suitable for use in high power and wide bandwidth power converters independent of polarity.

These and other objects, features and advantages are disclosed and claimed in the specification, figures and claims of the present application.

DETAILED DESCRIPTION OF THE PREFERRED EMBODIMENT

Figure 1:
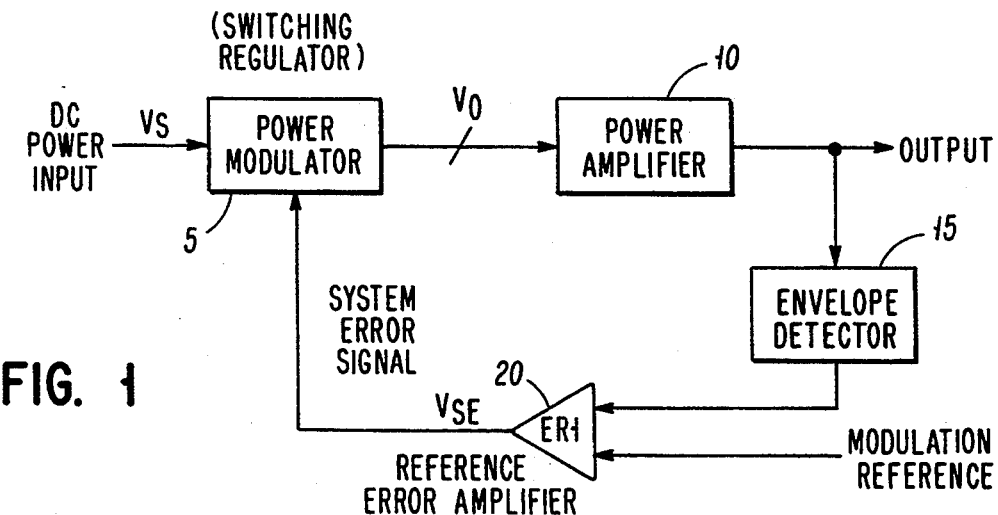
FIG. 1, illustrates a block diagram of the present invention implemented in conjunction with a power amplifier.

Referring now to the drawings wherein like items are referenced as such throughout, FIG. 1 illustrates one implementation of the teachings of the present invention. A DC power input $V_s$ is coupled to power modulator means 5. Power modulator means has a bipolar output signal $V_o$ coupled to power amplifier means 10. The output of power amplifier means is looped back into power modulator means 5 via envelope detector means 15 and reference error amplifier 20. Error amplifier 20 receives an additional signal from a modulation reference source not shown in FIG. 1.

Figure 2:
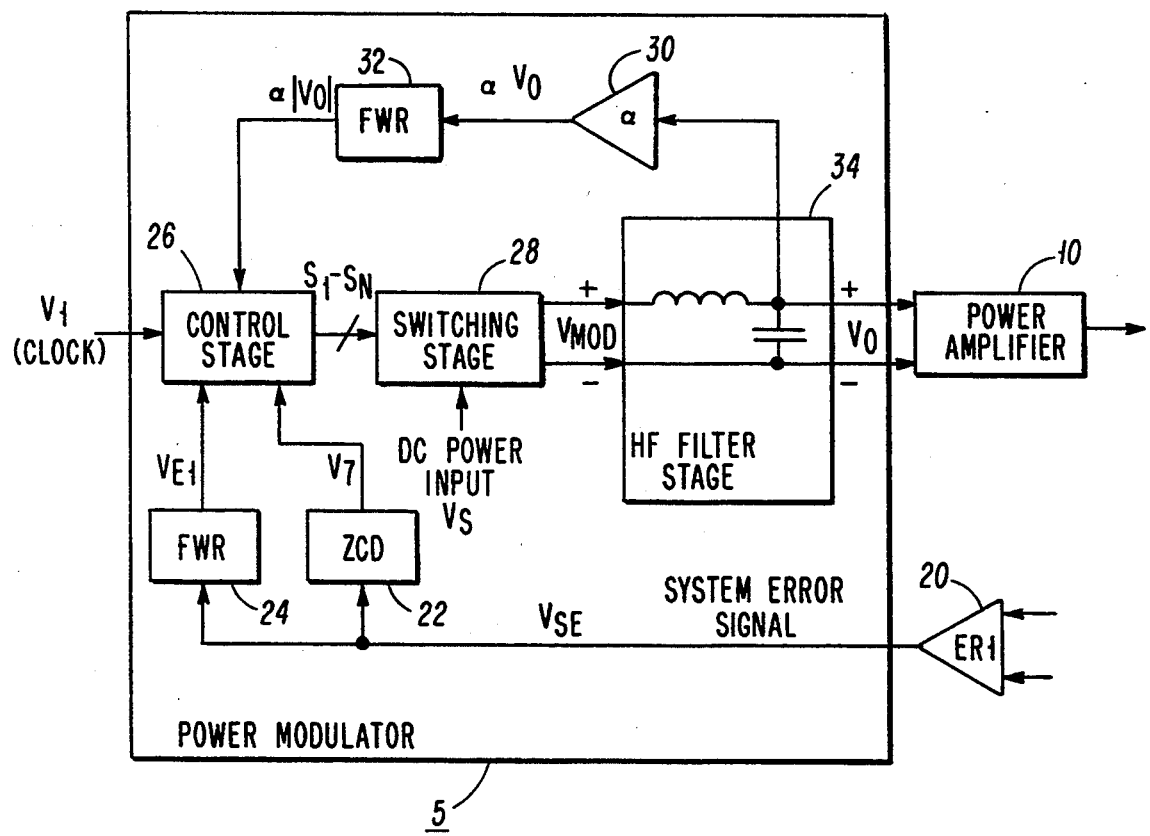
FIG. 2, illustrates a block diagram of the power modulator unit of FIG. 1.

FIG. 2 illustrates a block diagram of the power modulator means of FIG. 1. The output of reference error amplifier 20, $V_{se}$ is coupled to zero crossing detector (ZCD) means 22 and full wave rectifier (FWR) means 24. The outputs of the ZCD and the FWR, $V_7$ and $V_{E1}$ respectively, are coupled to control stage means 26. A clock signal, $V_1$, is also coupled to control stage means 26. A plurality of output signals, $S_1$–$S_n$, are routed from the control stage means to switching stage means 28. A DC power input signal, $V_s$, is also coupled to switching stage means 28. The output of switching stage means 28, $V_{MOD}$, is coupled to High Frequency Filter Stage means 34. The output of HF filter 34, $V_o$, is fed back to control stage means 26 via voltage attenuation means 30 and a second FWR means 32, as well as being routed to power amplifier means 10.

Figure 3:
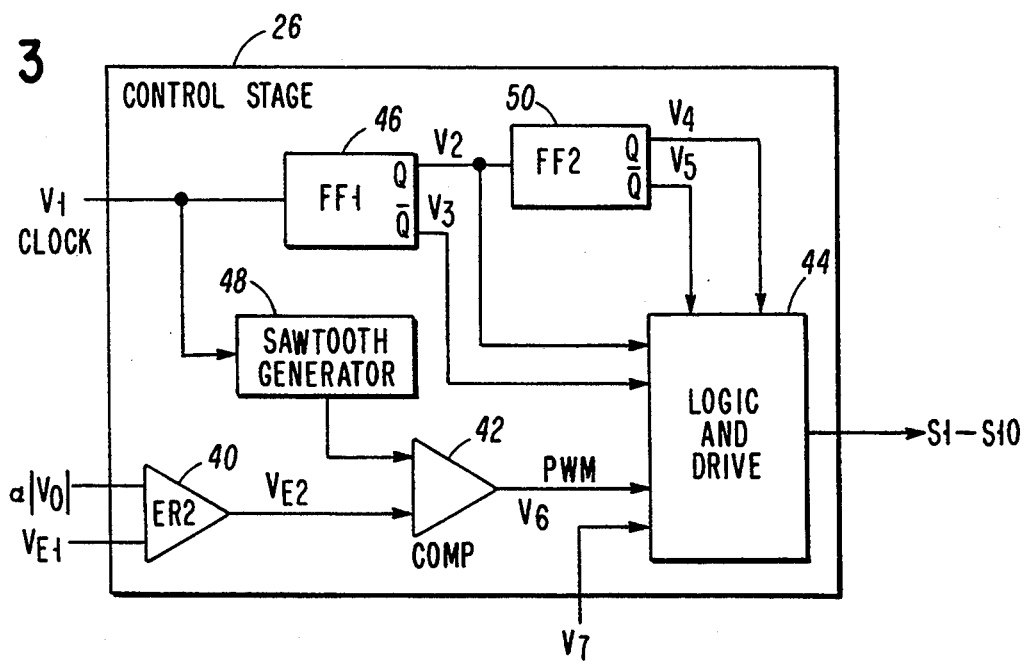
FIG. 3, illustrates a block diagram of the control stage unit of FIG. 2.

FIG. 3 illustrates a block diagram of the control stage means depicted in FIG. 2. A reference error amplifier, 40, has a first and second input, $V_{E1}$ and $\alpha|V_o|$, received from FWR 24 and attenuator 30, respectively (both shown in FIG. 2). A clock signal $V_1$ is routed to a first flip-flop device 46, and sawtooth generator means 48. Comparator means 42 receives a first input from sawtooth generator means and a second input $V_{E2}$ from the output of amplifier 40. The pulse-width-modulated (PWM) output from comparator 42, $V_6$, is coupled to logic and drive means 44. Flip-flop means 46 has a first output $V_3$ coupled to logic and drive means 44. A second output from flip-flop means 46, $V_2$, is coupled to second flip-flop means 50 and also to logic and drive means 44. Flip-flop means 50 has two output signals $V_4$ and $V_5$ coupled to logic and drive means 44. Logic and drive means 44 also receives an input signal $V_7$ from ZCD means 22 (see FIG. 2). A plurality of output signals $S_1$ through $S_n$ extend from logic and drive means 44 coupled to switching stage means 28 (see FIG. 2).

Figure 4:
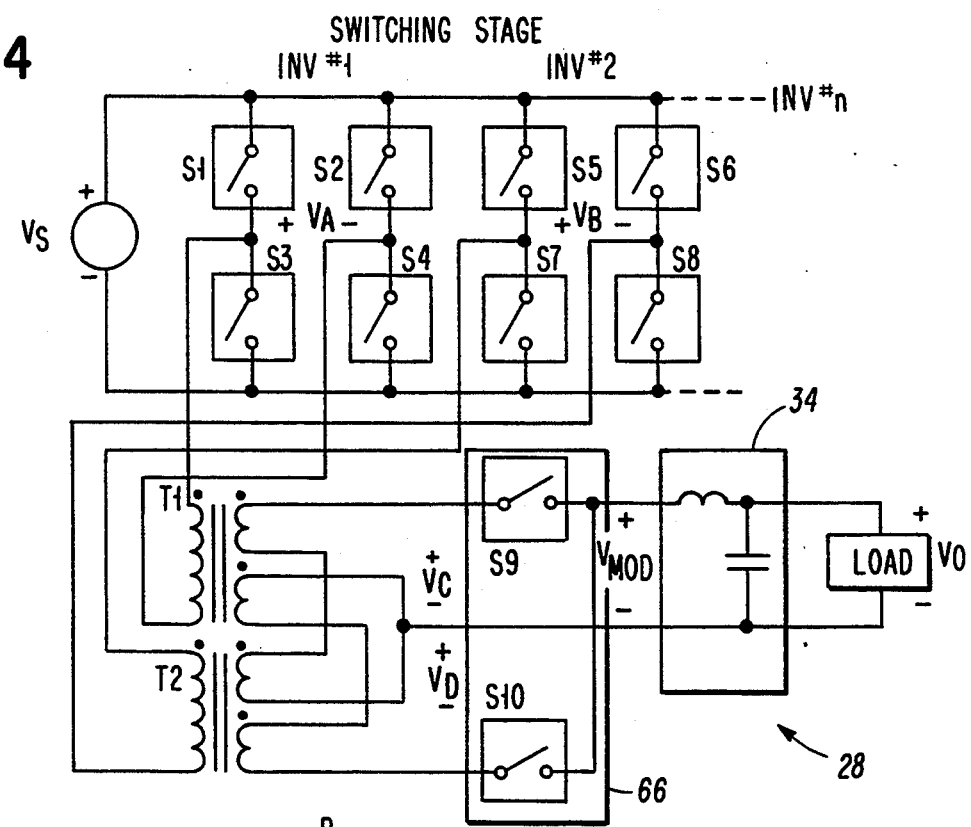
FIG. 4, illustrates a block diagram of the switching stage unit of FIG. 2.

Switching stage means 28 is schematically depicted in FIG. 4. A voltage source $V_s$ is coupled in parallel to a plurality of inverter devices $Inv_1$ through $Inv_n$. The teachings of the present invention can be adequately described for n=2. Inverter $Inv_1$ is comprised of two pairs of switching means $S_{11}$ through $S_4$. First switching means pair $S_1$ and $S_3$ are coupled to one side of a primary coil of a first transformer device $T_1$. Second switching means pair $S_2$ and $S_4$ are coupled to a second side of the primary coil of transformer $T_1$, resulting in the application of voltage $V_A$. A second transformer device $T_2$ is similarly coupled to $Inv_2$ switching means $S_5$ through $S_8$, resulting in the application of voltage $V_B$. The secondary coils of transformers $T_1$ and $T_2$ are coupled to each other to form outputs $V_C$ and $V_D$, each of which is equal to $V_A$ plus $V_B$ and is applied to the bi-directional switch means 66 comprising $S_9$ and $S_{10}$. The output of bi-directional switch means 66, $V_{MOD}$, is coupled to HF filter means 34 whose output is denoted as voltage $V_o$.

When $S_1$ ($S_5$) and $S_4$ ($S_8$) are turned on, $V_A$ ($V_B$) is $+V_S$. When $S_2$ ($S_6$) and $S_3$ ($S_7$) are turned on, $V_A$ ($V_B$) is $-V_S$. When $S_1$ ($S_5$) and $S_2$ ($S_6$) are turned on, $V_A$ ($V_B$) is zero. For n inverters, each period of the inverter frequency, fs/n, is divided into 2n time divisions and the operation of each inverter is time delayed relative to its neighbor by a factor of 1/(2fsn) seconds. When it is desired that $V_{MOD}$ be positive (negative) and the pulse train $V_C$ is also positive (negative), then $S_9$ is turned on. When it is desired that $V_{MOD}$ be positive (negative) but the pulse train $V_D$ is negative (positive), then $S_{10}$ is turned on.

Figure 5:
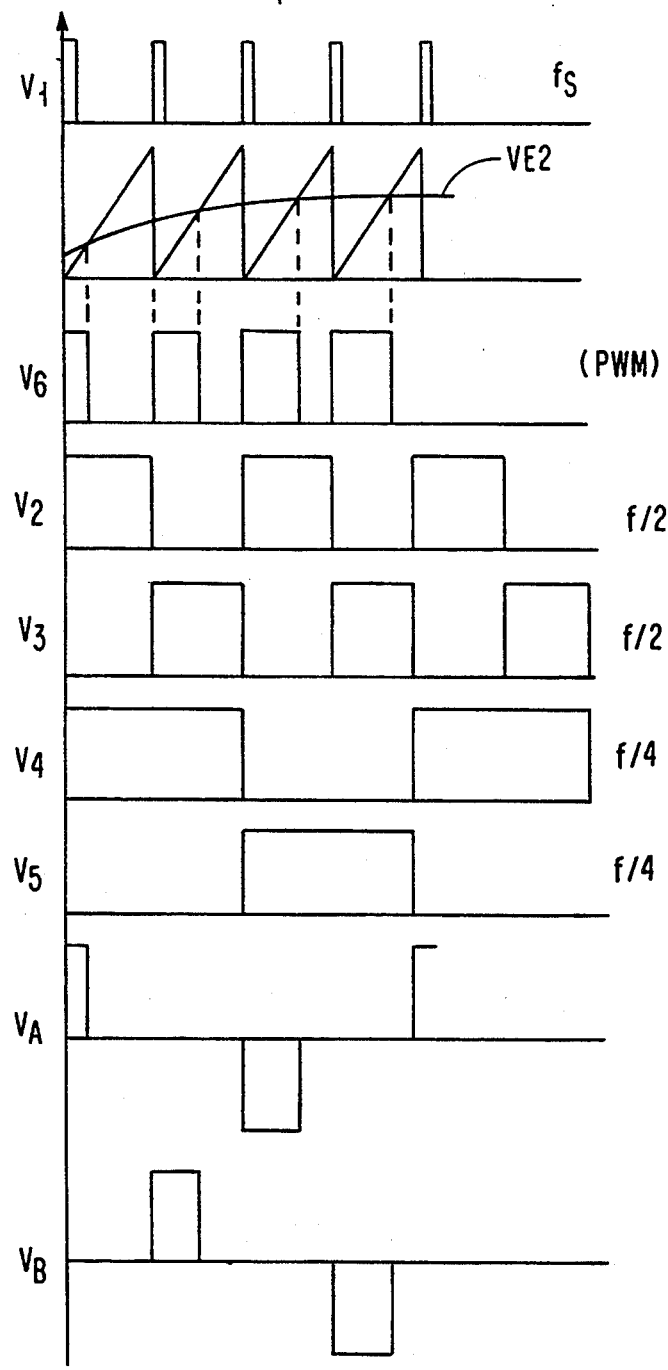
FIG. 5, is a timing diagram of the invention according to FIG. 2.
Figure 6:
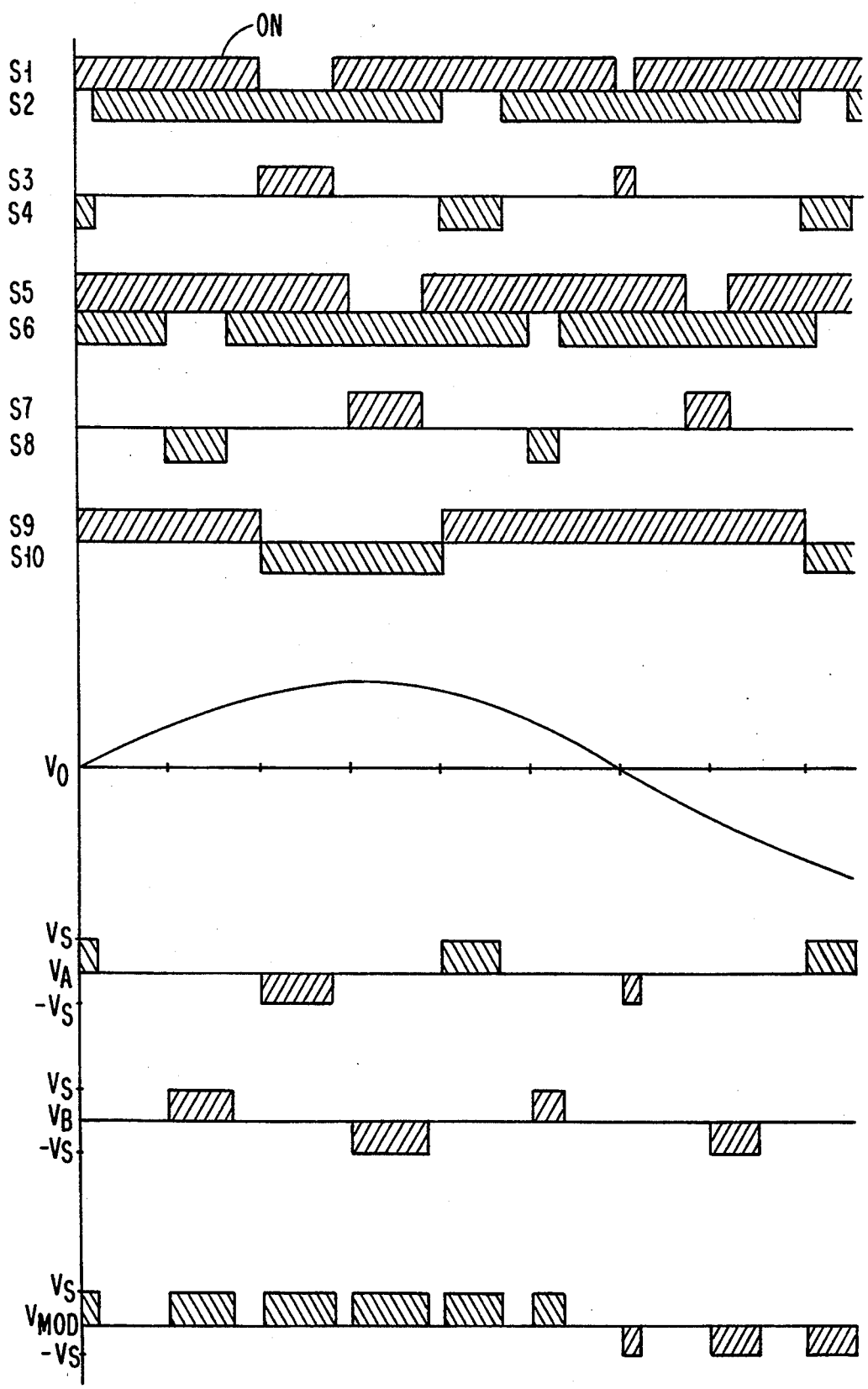
FIG. 6, is a continuation of the timing diagram of the invention according to FIG. 2.

FIGS. 5 and 6 represent exemplary timing diagrams for the above described apparatus for n=2.

Because for n>1, there is always at least 50% dead time for a given inverter, there is adequate time to commutate the bi-directional switch in an optimum way, such as resonant transistor switching.

Figure 7:
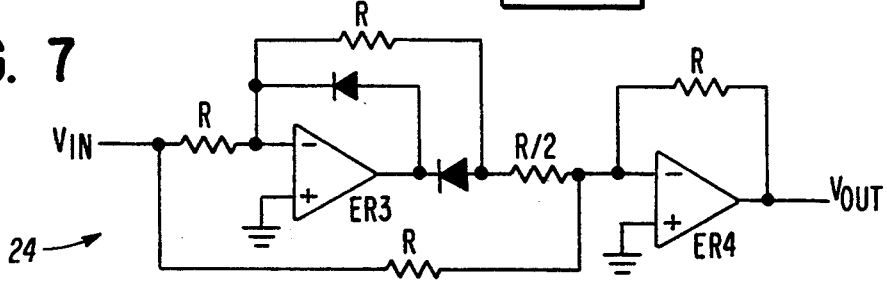
FIG. 7, illustrates a block diagram of the Full Wave Rectifier unit of FIG. 2.

FIG. 7 depicts the FWR means illustrated in FIG. 2 which is the standard ideal diode configuration.

Figure 8:
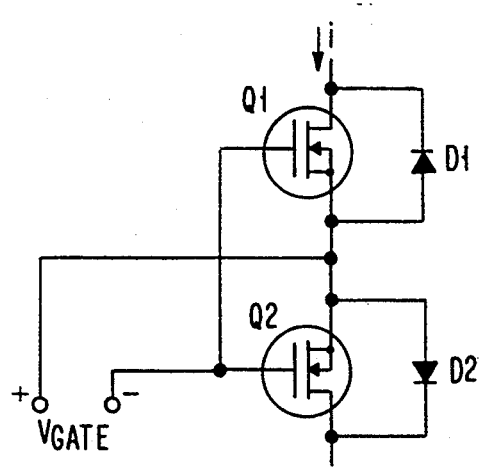
FIG. 8, illustrates a schematic diagram of a bidirectional switch of FIG. 4.

FIG. 8 depicts the schematic diagram of $S_9$ or $S_{10}$ in the bi-directional switch 66. The specific embodiment illustrates a pair of FETs $Q_1$ and $Q_2$ coupled source terminal to source terminal, each having an intrinsic diode coupled across its source and drain. In the absence of a gate drive signal $V_{GATE}$, the switch blocks in either direction; in the presence of $V_{GATE}$, the switch conducts in either direction. Since the FET channel voltage drop is much less than the intrinsic diode drop, problems with the relatively slow intrinsic diode recovery are obviated.

Interleaved systems can also be paralleled to reduce losses per inverter transistor even further. For "p" parallel interleaved systems of "n" inverters, the transistor conduction and switching losses are reduced by a factor of 1/n due to time multiplexing and by a factor of 1/p due to current sharing, compared to a single large inverter operating at $f_s/2$. The total transistor loss reduction may therefore be referred to as 1/np. Current mode control would be used for the "p" interleaved systems in order to ensure equal current sharing. Although rather transistor intensive, the scheme provides the inherent advantage of sharing losses among multiple devices and permitting a higher sampled-data frequency (bandwidth) then could be achieved in one inverter stage. For example, if 60 kilohertz bandwidth and 500 watts can be achieved in a single inverter module, then n=4 allows a 240 kilohertz bandwidth and 2 kilowatts and n=4 and p=2 would allow 4 kilowatts. For n=4, a 10 kilowatts application would require p=5, or a total of 20 inverter modules. Larger transistors could be used to reduce p at the expense of greater switching times, greater switching losses and poorer control.

It is thought that the methods of the present invention and many of its attendant advantages will be understood from the foregoing description, and it will be apparent that various changes may be made in the form, construction and arrangement of the parts and the steps thereof without departing from the spirit and scope of the invention, or sacrificing all their material advantages, the forms described herein being merely preferred embodiments thereof.

I claim:

1. An interleaved direct current to alternating current power converter apparatus comprising:
   power modulation means having a plurality of inverters and a bipolar output signal;
   power amplifier means for receiving the bipolar output signal of the power modulation means and for providing an output signal; and
   first error detection means coupled between the output signal of the power amplifier means and the power modulation means for controlling modulation;
   wherein the power modulation means includes control stage means coupled to zero crossing detector means and second error detection means,
   switching stage means for receiving a plurality of signals from the control stage means;
   high frequency filter stage means coupled to the switching stage means; and,
   third error detection means coupled to the high frequency filter means and to the control stage means, thereby allowing switching losses and conduction to be evenly distributed among all inverters of the power modulation means.

2. The apparatus of claim 1 wherein the switching stage means comprises:
   a plurality of inverter means coupled in parallel to a voltage source and a equivalent number of transformers; and
   bi-directional switching means coupled to the output of transformer means.

3. The apparatus of claim 2 wherein the bi-directional switching means comprises:
   an even number of transistor devices coupled in conjunction with a complementary number of diode devices such that electrical conduction is always through the transistors regardless of current polarity.

4. The apparatus of claim 2 wherein the bi-directional switching means comprises a pair of field effect transistors coupled source terminal to source terminal and each transistor having an intrinsic diode coupled across its source terminal and drain terminal.

5. The apparatus of claim 1 wherein each inverter means is comprised of two pairs of switching means.

6. The apparatus of claim 1 wherein the first full wave rectifier means is comprised of a pair of error amplifier means serially coupled to each other via a pair of diodes.

* * * * *